Aug. 21, 1951     D. B. WESTIN     2,565,155
GLASSWARE PRESSING MECHANISM
Filed Sept. 6, 1947            2 Sheets-Sheet 1
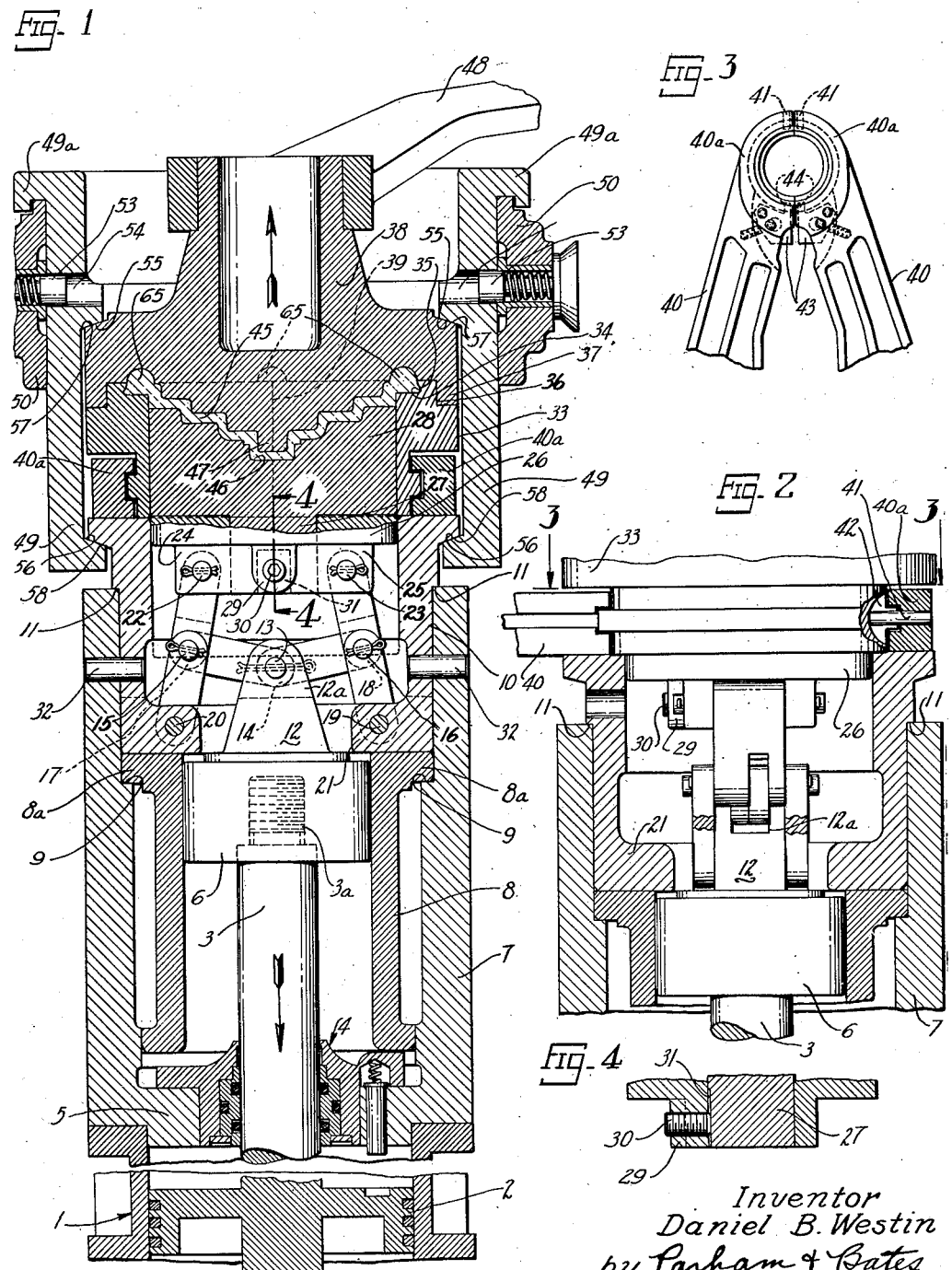
Inventor
Daniel B. Westin
by Parham & Bates
Attorneys Aug. 21, 1951     D. B. WESTIN     2,565,155
GLASSWARE PRESSING MECHANISM
Filed Sept. 6, 1947     2 Sheets-Sheet 2

Inventor
Daniel B. Westin
by Parham + Bates
Attorneys

Patented Aug. 21, 1951

2,565,155

UNITED STATES PATENT OFFICE 2,565,155

GLASSWARE PRESSING MECHANISM

Daniel B. Westin, West Hartford, Conn., assignor to Emhart Manufacturing Company, a corporation of Delaware Application September 6, 1947, Serial No. 772,529

2 Claims. (Cl. 49—38)

This invention relates generally to improvements in machinery for forming glassware and more particularly to a pressing mechanism for glass articles which are of a generally flat shape or have shallow cavities or depressions therein, as, for example, lamp bases, coasters, saucers, and the like.

An object of the invention is to provide a glassware pressing mechanism which can be incorporated in a well known forming machine for making glass articles by press-and-blow operations, simply by removing a few of normally replaceable elements of the press-and-blow machine and substituting therefor the parts of the pressing mechanism of the invention, whereby the press-and-blow machine can be readily converted when desired to the making of wholly pressed articles such as those above described.

A further object of the invention is to provide a pressing mechanism of the character described by which the required pressing action on a glass charge can be obtained when incorporated in the above-mentioned well known glassware forming machine by power exerted by an air motor which customarily is included in that machine and which would be ineffective without novel structure of the pressing mechanism of the invention to provide the required pressing force.

A further object of the invention is to provide a glassware pressing mechanism wherein the pressing pressure is applied through a toggle joint structure which is adapted for operative connection with an air motor such as that included in the aforesaid known forming machine.

A further object of the invention is to provide a pressing mechanism comprising relatively movable parts and operating means therefor so constructed and arranged that a downwardly delivered charge of molten glass from a feeder or other source will be received by and supported by one of such relatively removable parts, after which they will be cooperatively positioned to form a closed press mold in which the charge will be pressed by an upward stroke of the charge-supporting movable part to form the article desired.

Another object of the invention is to provide a glassware pressing mechanism which will afford facilities for delivering each article of glassware pressed therein at a delivery station spaced from the pressing station.

Other objects and advantage of the invention will hereinafter be pointed out or will become apparent from the following description of a practical embodiment of the invention, as disclosed in the accompanying drawings, in which:

Fig. 1 is a fragmentary view, showing in vertical section the pressing mechanism operatively connected with an air motor, the relatively movable parts of the mechanism being shown located in the positions which they occupy at the end of a pressing operation;

Fig. 2 is a fragmentary vertical sectional view of a portion of the mechanism shown in Fig. 1, taken at approximately a right angle with Fig. 1 and showing certain details of the toggle joint structure for operating the movable pressing part of the press mold;

Fig. 3 is a relatively reduced fragmentary view substantially along the plane indicated at 3—3, Fig. 2, showing the sectional character of the body part of the press mold and portions of the arms for movably supporting the sections thereof;

Figure 6:
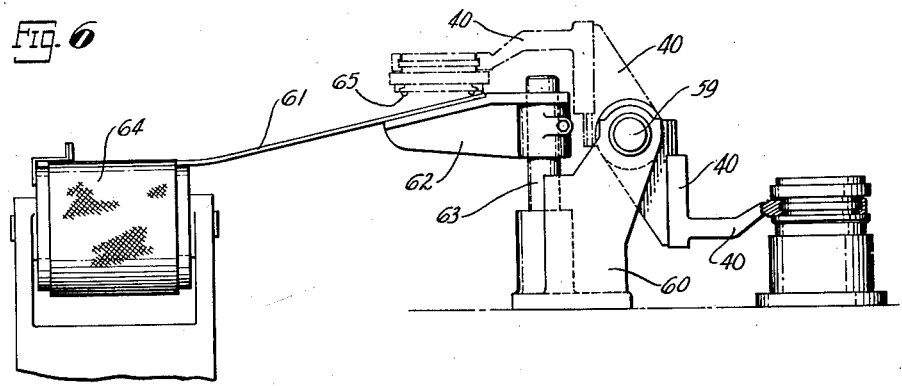
Figure 5:
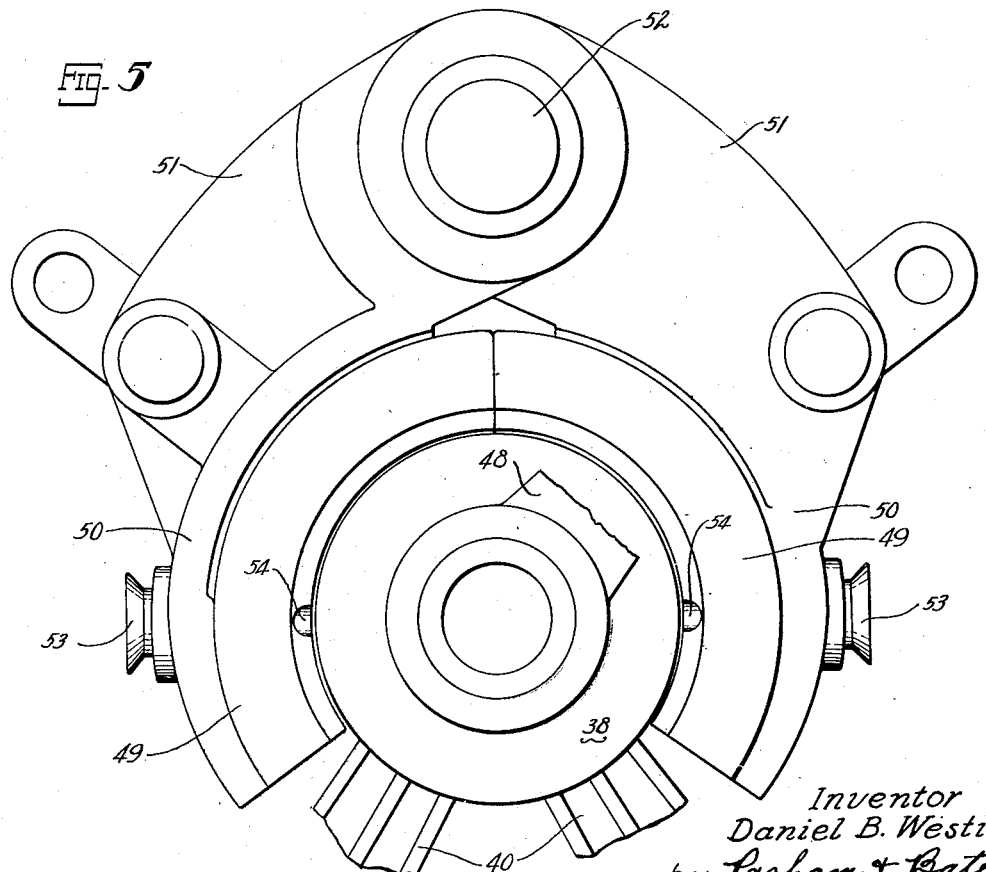
Fig. 5 is a fragmentary detail view of the lower part of the movable pressing element of the press mold, the view being taken substantially along the line 4—4 of Fig. 1.

Fig. 5 is a plan view of the press mold and of a clamping device for holding separable parts of such mold closed; and Fig. 6 is a relatively reduced, somewhat schematic, assembly view, showing the body part of the press mold supported to swing about a horizontal axis for transfer of a pressed article from the pressing station to a delivery station and showing diagrammatically means to receive the pressed article at the delivery station and to direct it onto an adjacent conveyor.

In Fig. 1, the numeral I designates an upright cylinder of an air motor which may be the air motor of the aforesaid known glassware forming machine, an example of which is disclosed by British Patent No. 560,672, of 1944 to the British Hartford-Fairmont Syndicate, Limited. A piston 2 of the air motor is reciprocable vertically in the cylinder I and carries an upwardly projecting piston rod 3 which extends slideably through a packing gland structure designated 4 which constitutes the central portion of an upper head 5 for the air motor cylinder. The piston rod 3 has its upper end portion reduced and externally screw threaded as indicated at 3a to adapt it for connection with an element that is to be actuated by the air motor. In the aforesaid forming machine, as it exists without application of the present invention thereto, the element connected with the upper end of the piston rod to be actuated thereby is a plunger (not shown) usable in the press-and-blow operation. When the present invention is to be employed, this plunger is replaced by an actuator head 6.

The upper head 5 for the cylinder 1 may also constitute the bottom head of an upright open cylindrical holder 7, in which the actuator head 6 is located and is spaced therefrom and guided for movement therein by a vertically disposed, open ended, cylindrical guiding liner or bushing 8. As shown, the cylindrical guiding member 8 has an external flange 8a at its upper end resting in part on an upwardly facing internal shoulder 9 of the holder 7 and the upper end of the guiding member 8 is located at a substantial distance below the level of the upper end of the cylindrical holder 7. A cylindrical supporting member 10 fits in part within this upper end portion of the holder 7, the lower end of the member 10 resting upon the upper end of the guiding member 8 and its upper end portion projecting a substantial distance above the upper end of the holder 7. As shown, the supporting member 10 has been formed to provide a downwardly facing shoulder 11 at the lower end of its projecting upper end portion at a level such as to rest upon the upper end of the holder 7. Obviously, structural details of provisions to position the member 10 in the holder 7 as deemed necessary or proper may be varied from those shown.

The actuator head 6 has a central, upward projection or lug 12, the upper part of which may be of substantially U-shape, as indicated at 12a and best seen in Fig. 2. This lug is pivotally connected at 13, Fig. 1, with the knuckle of a generally horizontally disposed toggle joint 14. The arms of this toggle joint are pivotally connected at 15 and 16, respectively, with the knuckles of similar, oppositely disposed, generally upright toggle joints 17 and 18, respectively, the lower ends of which are pivotally attached at 19 and 20, respectively, to a suitably slotted, inwardly extending flange 21 on the lower end portion of the cylindrical supporting member 10. The toggle joints 17 and 18 are pivotally connected at their upper ends at 22 and 23, respectively, with suitably slotted diametrically opposite depending lugs 24 and 25, respectively, on an attaching ring 26 which fits onto a depending central stem or stud portion 27 of a member 28 that constitutes the movable pressing part or plunger of the press mold of the present invention.

The attaching ring 26 may also be formed with a pendant, integral flap or ear 29 which carries a radial set screw 30 that can be tightened against a flattened lateral surface 31 on the stem or stud 27 to detachably fasten the attaching ring 26 to the pressing member 28. As will be apparent, this arrangement permits interchange of pressing members without the necessity of changing the attaching ring 26 or the toggle joint structure connected with the latter.

The cylindrical supporting member 10 constitutes a mount for the toggle joint structure. Fastening pins, as indicated at 32, may be employed to fasten the member 10 to the holder 7 to prevent accidental or unintended relative movement between these parts.

The press mold of apparatus embodying the present invention includes a mold body part 33 in which the pressing member 28 is slideable vertically, the upper end portion of this body part being counter-bored at 34 and formed with a slightly re-entrant or inwardly projecting lip, as indicated at 35, at the upper end of its counter-bored portion for a purpose to be presently described. The upper end portion of the mold body part 33 may be reduced externally to provide an open topped annular slot 36 in which a depending annular skirt or flange 37 of a mold baffle part 38 fits when these mold parts are in their cooperative mold-forming or closed positions at a pressing station as shown in Fig. 1.

The press mold body part 33 comprises two half sections, being divided longitudinally at the line 39, Fig. 1, when these sections are closed. At that time, the closed body part is substantially cylindrical at any horizontal level although this configuration may of course be varied if conditions require or if desired. The half sections of the mold part 33 are carried by the arms 40 which, in the glassware forming machine as it existed prior to the application of the present invention thereto, were employed to carry the half sections of the neck mold of that machine. These mold part sections are retained in the appropriately formed holding end portions 40a of the arms 40 by holding provisions which may be those of the existing machine, these comprising pins 41 carried by the outer extremities of the holding end portions of the arms in positions to engage with end portions 42 of the sections of the mold part 33 and spring pressed latches 43 carried by the opposite ends of the holding parts of the arms 40 for engaging, as at 44, Fig. 3, with the inner ends of the mold part sections. Any other suitable known fastening means to detachably retain the sections of the mold part in their holders may be employed.

The inner wall of the upper end portion 34 of the mold part 33 provides a peripheral wall for a molding cavity that is defined by the exposed internal surfaces of the press mold parts 28, 33 and 38 and also engages the formed article at its periphery when the sections of the mold part 33 are closed so as to provide a holder for the formed article. The particular press mold shown in Fig. 1 is intended for use to form a lamp base, designated 45, having a shape as shown when inverted as in this view. To this end, the lower mold part 28 has its upper glass contact face recessed axially as indicated at 46. The upper mold part 38, which constitutes the baffle, against which glass of a charge will be pressed by the part 28, is formed with a depending axial projection 47 on its glass contact face, this projection being adapted to enter and to be spaced suitably from the recessed face 46 of the part 28 when the mold baffle 38 has been positioned on the upper end of the mold body part 33, as shown in Fig. 1, and the pressing part 28 of the mold has been raised in the mold part 33 to the upper limit of its pressing stroke, as also shown in Fig. 1.

The mold baffle 38 may be moved vertically to and from its active or mold closing position at the pressing station and shifted laterally while thus moved by a suitable carrying arm, indicated at 48, which may be supported and operated by the usual baffle supporting and operating mechanism of the aforesaid glassware forming machine or in any other suitable known way.

To assure that mold parts 33 and 38 will remain in their active, mold-cavity defining positions as shown in Fig. 1 during a glass pressing operation, locking means may be employed. Such means may comprise a pair of clamping jaws 49, carried by holders 50 on a pair of horizontally swingable pivoted arms 51, mounted to swing about a vertical axis 52, as best seen in Fig. 5. The clamping jaws 49 may replace the sections of the parison body mold of the press and blow forming machine structure hereinbefore referred to and be carried and operated by means, including the arms 51, previously employed to carry and operate the parison body mold sections. Spring pressed latching pins 53, shown in Fig. 1, which are usual elements of the holders shown may be used to engage with suitable openings 54 in the clamping jaws to retain the clamping jaws in the holders 50. The clamping jaws 49 have recessed, outwardly and downwardly turned flanges 49a fitting over the upper edge portions of the holders 50, and these co-operate with the latching pins 53 to lock the clamping jaws firmly in place on their holders 50. These clamping jaws have inwardly extending, upwardly inclined cam shoulders 55 and lower, downwardly inclined or sloping cam shoulders 56 for engaging with supplementarily inclined shoulders 57 and 58, respectively, on the mold baffle 38 and the upper end portion of the fixed supporting member 10, respectively, when the clamping jaws 49 are closed about these parts to hold the mold baffle 38 firmly in place on the mold body part 33. At this time, the depending skirt or flange 37 of the baffle will be held in overlapping relation to the closed sections of the part 33 around the molding cavity so as to resist any pressure tending to open these sections. Suitable movements of the arms 51 for opening and closing of the clamping jaws may be effected by the usual mechanism for operating these arms in the glassware forming machine referred to or any other suitable known or preferred mechanism may be employed.

The arms 40 which, as aforesaid, are the usual neck ring supporting arms of the glassware forming machine referred to, are mounted for relative swinging movements to open and close the sections of the mold part 33 and also for swinging movements in unison about the axis of a horizontal supporting shaft 59, Fig. 6, from the full-line position to the dot-and-dash line position. The horizontal supporting shaft 59 is mounted in a fixed position, being carried by a bracket 60. This swinging movement of the arms 40 will, of course, invert the mold part carried thereby and is employed in the operation of the forming machine hereinbefore referred to to transfer the parison from the parison forming station to a blow mold station at which the parison is delivered to a blow mold of the machine for further expansion in the latter. When pressing mechanism of the present invention is applied to the forming machine structure referred to, the pressed article is transferred by operations of the arms 40 substantially as above described. The pressed article, when released by opening of the sections of the mold part 33 at the delivery station, may drop onto any suitable support, which may be an inclined plate or chute, indicated at 61 in Fig. 6. This support may be carried by a bracket 62 on an upright shaft 63 that constitutes an ordinary part of the machine. As shown, the inclined support 61 is positioned to discharge onto a conveyor 64.

From the foregoing description of the novel pressing mechanism, the operation thereof will be readily understood. A charge of molten glass from a glass feeder, not shown, or obtained in any other suitable known manner may be dropped onto the recessed face 46 of the pressing plunger 28 when the latter is at the lower end of its path of vertical movements. At this time, the highest part of the face 46 may be approximately level with the lower end of the closed mold body part 33 or may be at a somewhat higher level. Such level will be controlled by the extent of downward retraction of the actuator head 6, this in turn being effected by downward movement of the piston 2 in the cylinder 1 of the air motor of the apparatus. The glassware forming machine hereinbefore identified has timing mechanism adequate to regulate the times of the operations of any of its operating parts, such as the air motor. At the time of delivery of the charge thereto, the clamping device will be open and the baffle 38 will be in its raised inactive position to permit delivery of the charge into the closed part 33 of the press mold. Thereafter the baffle 38 will be moved to its active position on the upper end of the closed mold part 33 and the clamping device will be closed to lock the relatively movable mold parts 38 and 33 firmly together and the sections of the mold part 33 closed. The air motor then will be actuated to raise the actuator head 6. This will act through the toggle joint 14 to actuate the toggle joints 17 and 18 simultaneously and as a unit, thereby raising the pressing mold part 28 with great force to press the glass carried thereby against the baffle 38 and the exposed article rim-defining portion of the inner wall upper end portion of the mold part 33. This will produce the pressed article 45, as shown in Fig. 1. Such article, as aforesaid, is a lamp base which is formed in inverted position, the mold baffle 38 being provided at angularly spaced places around its glass contact surface with small depressions or cavities, as indicated at 65 in Fig. 1, into which enough glass of the charge will be forced to constitute supporting beads or feet on the lamp base.

After the pressing action has been completed, the mold clamp will be opened, the mold baffle 38 will be removed, the pressing plunger 28 will be retracted downwardly and the arms 40 will be operated to swing from a full-line position to the dot-and-dash line position of Fig. 6. During this movement of the arms 40, they will remain closed and the mold part 33 and the pressed glass article carried thereby will be carried to a delivery position over the inclined support 61, at which position the article will be presented in its normally upright position. The arms 40 are then operated to open the sections of the mold part 33 to release the pressed article onto the delivery member. The sections of the mold part 33 thereafter are closed by closing of their arms 40 and are returned to the pressing station by return swinging movements of these arms so that a new cycle of operations to form another pressed article may be initiated.

It will be noted that the novel pressing mechanism may be made suitable for the production of different pressed articles at different times by changing only the parts which enter directly into the formation of the press mold, that is, simply by substituting different mold parts 28, 33 and 38. While this pressing mechanism has been disclosed as adapted for use in conjunction with supporting and operating parts of a particularly identified known forming machine. It is not limited thereto. Any other suitable known supporting and operating structures may be employed.

I do not wish to be limited to the details of the illustrative embodiment of the invention shown in the drawings and herein particularly described as many changes therein and modifications thereof will now be obvious or will readily occur to those skilled in the art.

I claim:

1. In a glassware pressing mechanism, the combination with a vertically disposed, hollow, open-ended press mold body having a baffle mounted on its upper end, of a pressing plunger fitting slidably in said press mold body for vertical movements therein toward and away from said baffle, said pressing plunger having a depending central attaching stem on its lower end, an attaching ring fitting removably on said attaching stem, means fastening said ring to said attaching stem, an air motor positioned below and in line with said plunger, and motion transmitting mechanism, including toggle joint means, operatively connecting said air motor with said attaching ring.

2. In a glassware pressing mechanism, an upright stationary cylindrical support, a press mold comprising a mold body part consisting of a pair of cooperative openable sections which, when closed, form a vertically disposed, hollow, open-ended member resting upon said cylindrical support in alignment therewith, a baffle removably disposed on the upper end of said hollow, open-ended member and including a depending annular flange fitting over the upper end portion of said member to maintain the sections thereof closed, a pressing plunger mounted for vertical movements in the press mold body part relative to the baffle, an air motor positioned below and in line with said plunger, motion transmitting means secured to and mounted within said stationary cylindrical support and operatively connecting the air motor with said pressing plunger, and clamping means comprising a pair of pivotally mounted cooperative jaws having vertically spaced cooperative portions respectively exerting a downward pressure on the baffle and an upward pressure on the stationary support and spanning the intervening mold body member to clamp all these parts together in assembled relations when said jaws are closed.

DANIEL B. WESTIN.

REFERENCES CITED

The following references are of record in the file of this patent:

UNITED STATES PATENTS

| Number | Name | Date |
|---|---|---|
| 301,131 | Kuntz | July 1, 1884 |
| 417,306 | Appert | Dec. 17, 1889 |
| 424,331 | Morton et al. | Mar. 25, 1890 |
| 1,037,841 | Cuming | Sept. 3, 1912 |
| 1,326,765 | Miller | Dec. 30, 1919 |
| 1,501,868 | Said et al. | July 15, 1924 |
| 1,670,821 | Pawling et al. | May 22, 1928 |
| 2,006,056 | McNamara | June 25, 1935 |

FOREIGN PATENTS

| Number | Country | Date |
|---|---|---|
| 560,672 | Great Britain | Apr. 14, 1944 |